United States Patent
Araki

(10) Patent No.: US 10,662,331 B2
(45) Date of Patent: May 26, 2020

(54) SILICONE GEL COMPOSITION AND SILICONE GEL CURED PRODUCT

(71) Applicant: SHIN-ETSU CHEMICAL CO., LTD., Tokyo (JP)

(72) Inventor: Tadashi Araki, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 81 days.

(21) Appl. No.: 15/746,509

(22) PCT Filed: May 23, 2016

(86) PCT No.: PCT/JP2016/065141
§ 371 (c)(1),
(2) Date: Jan. 22, 2018

(87) PCT Pub. No.: WO2017/018033
PCT Pub. Date: Feb. 2, 2017

(65) Prior Publication Data
US 2018/0201786 A1    Jul. 19, 2018

(30) Foreign Application Priority Data

Jul. 24, 2015 (JP) ................. 2015-146609

(51) Int. Cl.
| | | |
|---|---|---|
| *C08K 5/098* | (2006.01) | |
| *C08L 83/05* | (2006.01) | |
| *C08L 83/07* | (2006.01) | |
| *C08L 83/10* | (2006.01) | |
| *C08L 83/04* | (2006.01) | |
| *C08G 77/20* | (2006.01) | |
| *C08G 77/12* | (2006.01) | |

(52) U.S. Cl.
CPC .............. *C08L 83/10* (2013.01); *C08K 5/098* (2013.01); *C08L 83/04* (2013.01); *C08G 77/12* (2013.01); *C08G 77/20* (2013.01); *C08G 2220/00* (2013.01); *C08L 2201/08* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | |
|---|---|---|
| 2,455,567 A | 7/1948 | Elliott |
| 4,528,313 A | 7/1985 | Swihart et al. |
| 9,598,576 B2 * | 3/2017 | Okawa ............ C08K 5/56 |
| 2016/0168359 A1 | 6/2016 | Kleyer et al. |
| 2016/0215099 A1 | 7/2016 | Enami |

FOREIGN PATENT DOCUMENTS

| | | |
|---|---|---|
| GB | 2 403 723 A | 1/2005 |
| JP | 58-65751 A | 4/1983 |
| JP | 2008-291148 A | 12/2008 |
| JP | 2015-7203 A | 1/2015 |
| WO | WO 2015/033979 A1 | 3/2015 |
| WO | WO 2015/034029 A1 | 3/2015 |

OTHER PUBLICATIONS

International Search Report, issued in PCT/JP2016/065141, dated Aug. 16, 2016.
Written Opinion of the International Searching Authority, issued in PCT/JP2016/065141, dated Aug. 16, 2016.
Extended European Search Report dated Nov. 14, 2018, in European Patent Application No. 16830138.0.

* cited by examiner

Primary Examiner — Tae H Yoon
(74) Attorney, Agent, or Firm — Birch, Stewart, Kolasch & Birch, LLP

(57) ABSTRACT

Provided are: a silicone gel composition providing a silicone gel cured product having excellent heat resistance at high temperatures; and a cured product (silicone gel) thereof.
This silicone gel composition is an addition reaction-curable silicone gel composition containing, with respect to the total (mass) of the composition, 1-1,000 ppm of a niobium carboxylate and/or nickel carboxylate represented by the following formula (3).

$$(R^3COO)_f M \quad (3)$$

(In the formula, $R^3$ is a homogeneous or heterogeneous monovalent hydrocarbon group, M is at least one metal selected from among nickel and niobium, and f is 2 when M is nickel and 4 or 5 when M is niobium).

7 Claims, No Drawings

SILICONE GEL COMPOSITION AND SILICONE GEL CURED PRODUCT

The present application is a National Stage entry of PCT International Application No. PCT/JP2016/065141, filed on May 23, 2016, which claims priority under 35 U.S.C. § 119(a) to Japanese Patent Application No. 2015-146609, filed in Japan on Jul. 24, 2015, the entire contents of all of which are expressly incorporated by reference into the present application.

TECHNICAL FIELD

This invention relates to a silicone gel composition which cures into a silicone gel cured product (so-called silicone gel) having excellent heat resistance, and a silicone gel cured product obtained by curing the composition.

BACKGROUND ART

Silicone gel compositions are prepared as addition reaction-curable organopolysiloxane compositions comprising an organohydrogenpolysiloxane having a silicon-bonded hydrogen atom (i.e., SiH group), an organopolysiloxane having a silicon-bonded alkenyl group such as vinyl, and a platinum-based catalyst wherein addition reaction of the silicon-bonded hydrogen atom to the alkenyl group yields cured products. The silicone gel compositions are heat cured into silicone gel cured products (i.e., cured silicone gels), which find use in the protection of electronic parts including automobile electronic parts and consumer electronic parts because of improved heat resistance, weather resistance, oil resistance, freeze resistance, and electrical insulation as well as low elastic modulus and low stress. The low elastic modulus and low stress which are characteristic of the cured silicone gel are not available from other elastomer products. The recent demand for automobile and consumer electronic parts having higher reliability imposes an increasing need to impart heat resistance to a silicone gel material for encapsulation.

In typical silicone rubbers, loading of fillers such as carbon and iron oxide is an effective means for improving heat resistance. However, the filler loading is not readily acceptable as the means for improving the heat resistance of silicone gel materials, which are required to have low viscosity and transparency, because there emerge such disadvantages as transparency lowering, filler settlement, and poor workability due to increased viscosity.

JP-A 2008-291148 (Patent Document 1) describes the use of a cerium metal salt as the means for imparting heat resistance. However, cerium which is a rare earth element is problematic in steady availability. A new means for imparting heat resistance is thus desired.

Recently, JP-A 2015-007203 (Patent Document 2) describes the use of iron carboxylate as the means for imparting heat resistance. In either of JP-A 2008-291148 and JP-A 2015-007203, the metal salt must be mixed with an organopolysiloxane and heat treated to form a reaction product prior to addition. Therefore, problems of process shortening and simple material supply remain unsolved.

PRIOR ART DOCUMENTS

Patent Documents

Patent Document 1: JP-A 2008-291148
Patent Document 2: JP-A 2015-007203

SUMMARY OF THE INVENTION

Problems to be Solved by the Invention

An object of the invention, which has been made under the above-mentioned circumstances, is to provide a silicone gel composition which cures into a silicone gel or cured product having heat resistance at high temperatures, and a cured product (silicone gel) thereof.

Means for Solving the Problems

Making extensive investigations to attain the above object, the inventor has found that an addition reaction-curable silicone gel composition which contains a nickel carboxylate and/or niobium carboxylate having the formula (3):

$$(R^3COO)_fM \qquad (3)$$

wherein $R^3$ which may be the same or different is a monovalent hydrocarbon group, M is at least one metal selected from nickel and niobium, f is 2 when M is nickel, and f is 4 or 5 when M is niobium, in an amount of 1 to 1,000 ppm based on the total weight of the composition cures into a silicone gel or cured product having excellent heat resistance. The invention is predicated on this finding.

Accordingly, the invention provides a silicone gel composition and a cured product (silicone gel) thereof, as defined below.

[1] A silicone gel composition comprising:
(A) 100 parts by weight of an organopolysiloxane having at least one silicon-bonded alkenyl group per molecule, represented by the average compositional formula (1):

$$R_aR^1_bSiO_{(4-a-b)/2} \qquad (1)$$

wherein R is independently alkenyl, $R^1$ is independently a substituted or unsubstituted monovalent hydrocarbon group free of aliphatic unsaturation, a is a positive number of 0.0001 to 0.2, b is a positive number of 1.7 to 2.2, and the sum a+b is 1.9 to 2.4,
(B) an organohydrogenpolysiloxane having at least two silicon-bonded hydrogen atoms per molecule, represented by the average compositional formula (2):

$$R^2_cH_dSiO_{(4-c-d)/2} \qquad (2)$$

wherein $R^2$ is independently a substituted or unsubstituted monovalent hydrocarbon group free of aliphatic unsaturation, c is a positive number of 0.7 to 2.2, d is a positive number of 0.001 to 0.5, and the sum c+d is 0.8 to 3, in such an amount as to give 0.01 to 3 silicon-bonded hydrogen atoms in component (B) per silicon-bonded alkenyl in the entire composition,
(C) an effective amount of a platinum-based catalyst, and
(D) a nickel carboxylate and/or niobium carboxylate having the formula (3):

$$(R^3COO)_fM \qquad (3)$$

wherein $R^3$ which may be the same or different is a monovalent hydrocarbon group, M is at least one metal selected from nickel and niobium, f is 2 when M is nickel, and f is 4 or 5 when M is niobium, in an amount of 1 to 1,000 ppm based on the total weight of the composition.
[2] The silicone gel composition of [1] which cures into a cured silicone gel having a penetration of 10 to 150 according to JIS K2220.
[3] The silicone gel composition of [1] or [2] which cures into a cured silicone gel having a loss factor of 0.1 to 1.0 at 25° C. and shear frequency 1 Hz and a loss factor of 0.3 to 1.5 at 25° C. and shear frequency 10 Hz.
[4] A cured silicone gel which is obtained by curing the silicone gel composition of any one of [1] to [3].

Advantageous Effects of the Invention

The silicone gel composition of the invention yields a cured silicone gel having better heat resistance at high temperature than any prior art compositions.

EMBODIMENT FOR CARRYING OUT THE INVENTION

The silicone gel composition of the invention is defined as comprising the following components (A) to (D) as essential components. As used herein, the "silicone gel cured product" or "silicone gel" refers to a cured product which is mainly composed of an organopolysiloxane, has a very low crosslinking density, and exhibits a penetration of 10 to 150 according to JIS K2220 (¼ cone). The cured product is equivalent to one having a rubber hardness of 0 by rubber hardness measurement according to JIS K6249 and hence, a hardness as low as not to exhibit an effective rubber hardness (i.e., is soft). In this respect, the cured silicone gel is distinguished from typical cured silicone rubbers (i.e., rubber-like elastomers).

The components are described below in detail. It is noted that the viscosity is measured at 25° C.
[(A) Organopolysiloxane]

Component (A) is a main component (i.e., base polymer) of the silicone gel composition. Component (A) is an organopolysiloxane having on average at least one alkenyl group bonded to a silicon atom (referred herein to as "silicon-bonded alkenyl group") per molecule, represented by the average compositional formula (1).

Herein R is independently alkenyl, $R^1$ is independently a substituted or unsubstituted monovalent hydrocarbon group free of aliphatic unsaturation, a is a positive number of 0.0001 to 0.2, b is a positive number of 1.7 to 2.2, and the sum a+b is 1.9 to 2.4.

In formula (1), R is independently an alkenyl group of typically 2 to 6 carbon atoms, preferably 2 to 4 carbon atoms, and more preferably 2 to 3 carbon atoms. Examples include vinyl, allyl, propenyl, isopropenyl, butenyl, and isobutenyl, with vinyl being most preferred. $R^1$ is independently a substituted or unsubstituted monovalent hydrocarbon group free of aliphatic unsaturation, typically having 1 to 10 carbon atoms, preferably 1 to 6 carbon atoms. Examples include alkyl groups such as methyl, ethyl, propyl, isopropyl, butyl, isobutyl, tert-butyl, pentyl, hexyl, cyclohexyl, octyl and decyl; aryl groups such as phenyl and tolyl; aralkyl groups such as benzyl and phenylethyl; and substituted forms of the foregoing in which some or all hydrogen atoms are substituted by halogen (e.g., chloro, bromo or fluoro), such as chloromethyl and 3,3,3-trifluoropropyl. Of these, methyl, phenyl and 3,3,3-trifluoropropyl are preferred for ease of synthesis.

The subscript "a" should be a positive number of 0.0001 to 0.2, preferably 0.0005 to 0.1; b should be a positive number of 1.7 to 2.2, preferably 1.9 to 2.02. The sum a+b should be in the range from 1.9 to 2.4, preferably from 1.95 to 2.05.

Component (A) should have at least one silicon-bonded alkenyl group per molecule, preferably 2 to 50, and more preferably 2 to 10 silicon-bonded alkenyl groups per molecule on average of the entire component (A). The values of a and b may be selected so as to meet the requirement for the silicon-bonded alkenyl group.

The molecular structure of the organopolysiloxane (A) is not particularly limited. It may have a linear structure or a branched structure containing such units as $RSiO_{3/2}$, $R^1SiO_{3/2}$ (wherein R and $R^1$ are as defined above), and $SiO_2$ units. Preferred is an organopolysiloxane having the general formula (1a):

[Chemical Formula 1]

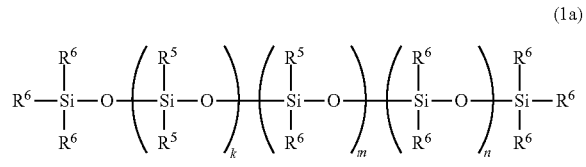

wherein $R^5$ is independently a substituted or unsubstituted monovalent hydrocarbon group free of aliphatic unsaturation; $R^6$ is independently a substituted or unsubstituted monovalent hydrocarbon group free of aliphatic unsaturation or an alkenyl group, with the proviso that at least one $R^6$ is alkenyl, preferably 2 to 50 $R^6$, more preferably 2 to 10 $R^6$ are alkenyl; where either one of $R^6$ at both ends of the molecular chain is alkenyl, k is an integer of 40 to 1,200, m is an integer of 0 to 50, n is an integer of 0 to 50, and the sum k+m+n is an integer of 40 to 1,200; where none of $R^6$ at both ends of the molecular chain are alkenyl, k is an integer of 40 to 1,200, m is an integer of 1 to 50, n is an integer of 0 to 50, the sum m+n is an integer of at least 1, and k+m+n is an integer of 40 to 1,200, that is, a linear diorganopolysiloxane having a backbone consisting essentially of repeating diorganosiloxane units and blocked with triorganosiloxy groups at both ends of the molecular chain.

In formula (1a), $R^5$ is a substituted or unsubstituted monovalent hydrocarbon group free of aliphatic unsaturation, typically having 1 to 10 carbon atoms, preferably 1 to 6 carbon atoms. Examples are as exemplified for $R^1$. Inter alia, methyl, phenyl and 3,3,3-trifluoropropyl are preferred for ease of synthesis, chemical stability and the like.

Also, $R^6$ is a substituted or unsubstituted monovalent hydrocarbon group free of aliphatic unsaturation, typically having 1 to 10 carbon atoms, preferably 1 to 6 carbon atoms. Examples are as exemplified for $R^1$. Inter alia, methyl, phenyl and 3,3,3-trifluoropropyl are preferred for ease of synthesis, chemical stability and the like. Alternatively, $R^6$ is an alkenyl group, typically having 2 to 6 carbon atoms, preferably 2 to 4 carbon atoms, and more preferably 2 to 3 carbon atoms. Examples include vinyl, allyl, propenyl, isopropenyl, butenyl, and isobutenyl, with vinyl being preferred.

In formula (1a), where either one of $R^6$ at both ends of the molecular chain is alkenyl, k is an integer of 40 to 1,200, m is an integer of 0 to 50, n is an integer of 0 to 50, and the sum k+m+n is an integer of 40 to 1,200. Preferably, k is an integer of 100 to 1,000, m is an integer of 0 to 40, n is 0, and the sum k+m+n is an integer of 100 to 1,000, more preferably 100 to 600. Where none of $R^6$ at both ends of the molecular chain are alkenyl, k is an integer of 40 to 1,200, m is an integer of 1 to 50, n is an integer of 0 to 50, the sum m+n is an integer of at least one, and k+m+n is an integer of 40 to 1,200. Preferably, k is an integer of 98 to 1,000, m is an integer of 2 to 40, n is 0, and the k+m+n is an integer of 100 to 1,000, more preferably 100 to 600. Notably, the total number (or degree of polymerization) of repeating diorganosiloxane units, represented by k+m+n may be determined, for example, as a number average degree of polymerization by gel permeation chromatography (GPC) versus polystyrene standards using toluene as developing solvent. The values of k, m, and n may be determined as average values from the molar ratios of corresponding repeating units calculated from the blending ratios of starting monomers in preparation of component (A) and the value of k+m+n (number average degree of polymerization or the like).

Examples of the organopolysiloxane of formula (1a) include
both end dimethylvinylsiloxy-blocked dimethylpolysiloxane,
both end dimethylvinylsiloxy-blocked dimethylsiloxane/methylvinylsiloxane copolymers,
both end dimethylvinylsiloxy-blocked dimethylsiloxane/diphenylsiloxane copolymers,
both end dimethylvinylsiloxy-blocked dimethylsiloxane/methylvinylsiloxane/diphenylsiloxane copolymers,
both end dimethylvinylsiloxy-blocked methyltrifluoropropylpolysiloxane,
both end dimethylvinylsiloxy-blocked dimethylsiloxane/methyltrifluoropropylsiloxane copolymers,
both end dimethylvinylsiloxy-blocked dimethylsiloxane/methyltrifluoropropylsiloxane/methylvinylsiloxane copolymers,
both end trimethylsiloxy-blocked dimethylsiloxane/vinylmethylsiloxane copolymers,
both end trimethylsiloxy-blocked dimethylsiloxane/vinylmethylsiloxane/diphenylsiloxane copolymers,
both end trimethylsiloxy-blocked vinylmethylsiloxane/methyltrifluoropropylsiloxane copolymers,
trimethylsiloxy and dimethylvinylsiloxy-blocked dimethylpolysiloxane,
trimethylsiloxy and dimethylvinylsiloxy-blocked dimethylsiloxane/methylvinylsiloxane copolymers,
trimethylsiloxy and dimethylvinylsiloxy-blocked dimethylsiloxane/diphenylsiloxane copolymers,
trimethylsiloxy and dimethylvinylsiloxy-blocked dimethylsiloxane/diphenylsiloxane/methylvinylsiloxane copolymers,
trimethylsiloxy and dimethylvinylsiloxy-blocked methyltrifluoropropylpolysiloxane, trimethylsiloxy and dimethylvinylsiloxy-blocked dimethylsiloxane/methyltrifluoropropylsiloxane copolymers,
trimethylsiloxy and dimethylvinylsiloxy-blocked dimethylsiloxane/methyltrifluoropropylsiloxane/methylvinylsiloxane copolymers,
both end methyldivinylsiloxy-blocked dimethylpolysiloxane,
both end methyldivinylsiloxy-blocked dimethylsiloxane/methylvinylsiloxane copolymers,
both end methyldivinylsiloxy-blocked dimethylsiloxane/diphenylsiloxane copolymers,
both end methyldivinylsiloxy-blocked dimethylsiloxane/methylvinylsiloxane/diphenylsiloxane copolymers,
both end methyldivinylsiloxy-blocked methyltrifluoropropylpolysiloxane,
both end methyldivinylsiloxy-blocked dimethylsiloxane/methyltrifluoropropylsiloxane copolymers,
both end methyldivinylsiloxy-blocked dimethylsiloxane/methyltrifluoropropylsiloxane/methylvinylsiloxane copolymers,
both end trivinylsiloxy-blocked dimethylpolysiloxane,
both end trivinylsiloxy-blocked dimethylsiloxane/methylvinylsiloxane copolymers,
both end trivinylsiloxy-blocked dimethylsiloxane/diphenylsiloxane copolymers,
both end trivinylsiloxy-blocked dimethylsiloxane/methylvinylsiloxane/diphenylsiloxane copolymers,
both end trivinylsiloxy-blocked methyltrifluoropropylpolysiloxane,
both end trivinylsiloxy-blocked dimethylsiloxane/methyltrifluoropropylsiloxane copolymers, and
both end trivinylsiloxy-blocked dimethylsiloxane/methyltrifluoropropylsiloxane/methylvinylsiloxane copolymers.

Although the viscosity of the organopolysiloxane (A) is not particularly limited, it preferably has a viscosity at 25° C. in the range from 50 to 100,000 mPa·s, more preferably 100 to 10,000 mPa·s for ease of handling and working of the composition, strength of the cured product, and fluidity. Notably, the viscosity may be measured by a rotational viscometer, for example, BL, BH, BS or cone-plate type viscometer or rheometer (the same applies hereinafter).

The organopolysiloxane (A) may be used alone or in combination of two or more as long as it meets the requirement that it have at least one silicon-bonded alkenyl group per molecule on average of the entire component (A). For example, an organopolysiloxane having two silicon-bonded alkenyl groups per molecule, specifically at both ends of the molecular chain, and an organopolysiloxane having one silicon-bonded alkenyl group per molecule, specifically at one end of the molecular chain or organopolysiloxane having less than one silicon-bonded alkenyl group per molecule (e.g., a uniform mixture of an organopolysiloxane having one silicon-bonded alkenyl group at one end of the molecular chain and an organopolysiloxane having no silicon-bonded alkenyl groups per molecule, having the identical average degree of polymerization and distribution of degree of polymerization) are preferably mixed in a weight ratio of from about 100:0 to about 40:60, more preferably from about 100:0 to about 60:40 because this ensures that the composition becomes effectively curable and yields a soft (large penetration) cured silicone gel.

[(B) Organohydrogenpolysiloxane]

Component (B) is reactive with component (A) and serves as a crosslinker or curing agent. Component (B) is an organohydrogenpolysiloxane having at least two hydrogen atoms bonded to a silicon atom (referred herein to as "silicon-bonded hydrogen atoms" or "SiH groups") per molecule, represented by the average compositional formula (2):

$$R^2_c H_d SiO_{(4-c-d)/2} \qquad (2)$$ 

wherein $R^2$ is independently a substituted or unsubstituted monovalent hydrocarbon group free of aliphatic unsaturation, c is a positive number of 0.7 to 2.2, d is a positive number of 0.001 to 0.5, and the sum c+d is 0.8 to 3. The organohydrogenpolysiloxane has typically 2 to 500, preferably 3 to 300, more preferably 5 to 100, and even more preferably 10 to 80 SiH groups per molecule. The SiH groups may be attached to the silicon atom at the end and/or a non-terminal (i.e., intermediate) position of the molecular chain.

In formula (2), $R^2$ is independently a substituted or unsubstituted monovalent hydrocarbon group free of aliphatic unsaturation, typically having 1 to 10 carbon atoms, preferably 1 to 6 carbon atoms. Examples include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; and substituted forms of the foregoing in which some or all hydrogen atoms are substituted by halogen (e.g., chloro, bromo or fluoro) such as 3,3,3-trifluoropropyl. Of these, alkyl, aryl and 3,3,3-trifluoropropyl groups are preferred, with methyl, phenyl and 3,3,3-trifluoropropyl being most preferred.

The subscript c is a positive number of 0.7 to 2.2, preferably 1.0 to 2.1, d is a positive number of 0.001 to 0.5, preferably 0.005 to 0.1, and the sum c+d is 0.8 to 3, preferably 1.0 to 2.7, and more preferably 1.5 to 2.5.

The molecular structure of the organohydrogenpolysiloxane (B) is not particularly limited and may be a linear, cyclic, branched or three-dimensional network (or resinous). The number of silicon atoms per molecule, that is, the degree of polymerization is typically 2 to 1,000. For ease of handling and working of the composition and better properties (e.g., low modulus and low stress) of the cured product, the number of silicon atoms per molecule is preferably 4 to 500, more preferably 10 to 100. Notably, the degree of polymerization or molecular weight may be determined, for example, as a number average degree of polymerization or number average molecular weight by gel permeation chromatography (GPC) versus polystyrene standards using toluene as developing solvent.

Examples of the organohydrogenpolysiloxane having formula (2) include 1,1,3,3-tetramethyldisiloxane, 1,3,5,7-tetramethylcyclotetrasiloxane, methylhydrogensiloxane cyclic polymers, tris(dimethylhydrogensiloxy)methylsilane, tris(dimethylhydrogensiloxy)phenylsilane, methylhydrogensiloxane/dimethylsiloxane cyclic copolymers,
both end dimethylhydrogensiloxy-blocked methylhydrogenpolysiloxane,
both end dimethylhydrogensiloxy-blocked methylhydrogensiloxane/dimethylsiloxane copolymers,
both end dimethylhydrogensiloxy-blocked methylhydrogensiloxane/diphenylsiloxane copolymers,
both end dimethylhydrogensiloxy-blocked methylhydrogensiloxane/dimethylsiloxane/diphenylsiloxane copolymers,
both end trimethylsiloxy-blocked methylhydrogenpolysiloxane,
both end trimethylsiloxy-blocked dimethylsiloxane/methylhydrogensiloxane copolymers,
both end trimethylsiloxy-blocked methylhydrogensiloxane/diphenylsiloxane copolymers, and
both end trimethylsiloxy-blocked methylhydrogensiloxane/diphenylsiloxane/dimethylsiloxane copolymers.

The organohydrogenpolysiloxane (B) may be used alone or in combination of two or more. Preferably a mixture of an organohydrogenpolysiloxane having at least two silicon-bonded hydrogen atoms, specifically at least three silicon-bonded hydrogen atoms at midway the molecular chain (i.e., as side chain) and an organohydrogenpolysiloxane having only two silicon-bonded hydrogen atoms at both ends of the molecular chain in a weight ratio of from about 100:0 to about 5:95, more preferably from about 100:0 to about 8:92 is used because this ensures that the composition becomes effectively curable and yields a soft (large penetration) cured silicone gel.

Component (B) is added in such an amount as to give 0.01 to 3 silicon-bonded hydrogen atoms (i.e., SiH groups), preferably 0.05 to 2 SiH groups, more preferably 0.2 to 1.5 SiH groups in component (B) per silicon-bonded alkenyl in the entire composition (specifically, component (A)). If the number of SiH groups in component (B) per alkenyl group in the entire composition is less than 0.01, a gel or cured product is not obtained. If the number exceeds 3, the gel or cured product has poor heat resistance.

[(C) Platinum-Based Catalyst]

Component (C) is a catalyst for promoting hydrosilylation or addition reaction between silicon-bonded alkenyl groups in component (A) and silicon-bonded hydrogen atoms in component (B). Component (C) is a platinum-based catalyst (i.e., platinum or platinum-based compound) which is selected from well-known catalysts. Suitable examples include platinum-based catalysts such as platinum black, chloroplatinic acid, alcohol-modified products of chloroplatinic acid, and complexes of chloroplatinic acid with olefins, aldehydes, vinylsiloxanes or acetylene alcohols.

Component (C) may be blended in an effective amount, which is properly determined depending on the desired cure rate. The catalyst is typically added in such amounts as to give 0.1 to 1,000 ppm, preferably 1 to 300 ppm of platinum atom based on the total weight of components (A) and (B). If the amount of the catalyst is too much, the cured product may have poor heat resistance.

[(D) Nickel Carboxylate and/or Niobium Carboxylate]

Component (D) is a nickel carboxylate and/or niobium carboxylate having the following formula (3), which is an essential component for imparting excellent heat resistance to the silicone gel composition.

$$(R^3COO)_fM \qquad (3)$$

Herein $R^3$ which may be the same or different is a monovalent hydrocarbon group, M is at least one metal selected from nickel and niobium, f is 2 when M is nickel, and f is 4 or 5 when M is niobium.

In formula (3), $R^3$ which may be the same or different is preferably a monovalent hydrocarbon group having 1 to 20 carbon atoms, more preferably 1 to 18 carbon atoms. Examples include alkyl groups such as methyl, ethyl, propyl, isopropyl, butyl, isobutyl, tert-butyl, pentyl, hexyl, cyclohexyl, octyl, 2-ethylhexyl, nonyl, decyl, undecyl, dodecyl, heptadecyl and octadecyl; alkenyl groups such as vinyl, allyl, propenyl and (Z)-8-heptadecenyl, aryl groups such as phenyl, tolyl, xylyl and naphthyl; aralkyl groups such as benzyl, phenylethyl and phenylpropyl; and substituted forms of the foregoing in which some or all hydrogen atoms are substituted by halogen (e.g., chloro, bromo or fluoro), such as chloromethyl and 3,3,3-trifluoropropyl. Of these, octyl and 2-ethylhexyl are most preferred.

Examples of the nickel carboxylate and/or niobium carboxylate include nickel compounds and/or niobium compounds of 2-ethylhexanoic acid, naphthenic acid, oleic acid, lauric acid, and stearic acid.

In formula (3), the value of f which represents the valence number of the metal is 2 when M is nickel, and f is 4 or 5, preferably 4 when M is niobium.

The nickel carboxylate and/or niobium carboxylate as component (D) is present in an amount of 1 to 1,000 ppm, preferably 100 to 800 ppm, and more preferably 200 to 500 ppm based on the total weight of the composition (specifically, total weight of components (A) to (D)). If the content of the nickel carboxylate and/or niobium carboxylate is less than 1 ppm, the effect of improving heat resistance at high temperature is lost. Inversely, if the content exceeds 1,000 ppm, insulation is substantially reduced and curability is decreased.

[Other Optional Components]

Besides components (A) to (D), optional components may be blended in the silicone gel composition as long as the objects of the invention are not impaired. Exemplary components include reaction inhibitors, inorganic fillers, organopolysiloxanes having neither silicon-bonded hydrogen atoms nor silicon-bonded alkenyl groups, and heat resistance enhancers other than component (D), flame retardants, thixotropic agents, pigments, and dyes.

The reaction inhibitor is a component for controlling the reaction of the composition. Examples include acetylene, amine, carboxylic acid ester, and phosphorous acid ester-based reaction inhibitors.

Examples of the inorganic filler include fumed silica, crystalline silica, precipitated silica, hollow fillers, silsesquioxane, fumed titanium dioxide, magnesium oxide, zinc oxide, iron oxide, aluminum hydroxide, magnesium carbonate, calcium carbonate, zinc carbonate, laminar mica, carbon black, diatomaceous earth, and glass fibers; and the foregoing fillers which have been surface treated to be hydrophobic with organosilicon compounds such as organoalkoxysilane compounds, organochlorosilane compounds, organosilazane compounds, and low-molecular-weight siloxane compounds. Silicone rubber powder, silicone resin powder and similar powder may also be blended.

[Curing of Silicone Gel Composition]

The silicone gel composition may be prepared by mixing the foregoing components (A) to (D) and optional components if any in a standard way. Upon formulation, the composition may be divided into two or multiple parts, if desired. For example, the composition is divided into one part composed of a portion of component (A) and components (C) and (D), and another part composed of the remainder of component (A) and component (B), and these two parts are mixed together on use.

Thereafter the silicone gel composition may be cured at room temperature (25° C.±10° C.) or an elevated temperature for a particular application, for example, of about 35 to about 130° C., specifically about 50 to about 110° C. for about 30 to about 120 minutes, specifically about 40 to about 60 minutes to form a cured silicone gel.

The silicone gel composition is advantageously used to encapsulate or fill electric/electronic parts.

The cured product (i.e., silicone gel or cured silicone gel) of the silicone gel composition preferably has a penetration of 10 to 150, more preferably 20 to 100, and even more preferably 30 to 80, as measured according to JIS K2220 using a ¼ cone. If the penetration is less than 10, the electronic circuit may fail to withstand the stress induced upon curing of the silicone gel composition and be broken in part or the silicone gel may crack inside. If the penetration exceeds 150, a cured silicone gel having an ability to fully retain its shape may not be obtained or the silicone gel may flow away from the circuit after filling and curing.

The cured silicone gel has a loss factor at 25° C. and shear frequency 1 Hz of preferably 0.1 to 1.0, more preferably 0.12 to 0.8, and even more preferably 0.5 to 0.8 and a loss factor at 25° C. and shear frequency 10 Hz of preferably 0.3 to 1.5, more preferably 0.35 to 1.2, and even more preferably 0.4 to 1.0. If the loss factor at 25° C. and shear frequency 1 Hz is less than 0.1, the electronic circuit may fail to withstand the stress induced upon curing of the silicone gel composition and be broken in part or the silicone gel may crack inside. If the loss factor at 25° C. and shear frequency 10 Hz exceeds 1.5, a cured silicone gel having an ability to fully retain its shape may not be obtained and the silicone gel may flow away from the circuit after filling and curing.

EXAMPLES

Examples and Comparative Examples of the invention are given below by way of illustration and not by way of limitation. In Examples, parts and % are by weight. Vi stands for vinyl. The penetration is measured according to JIS K2220 with a ¼ cone, using an automatic penetrometer RPM-101 by Rigo Co., Ltd. The degree of polymerization or the number of repeating units is calculated from a number average degree of polymerization as analyzed by GPC versus polystyrene standards using toluene as developing solvent.

Example 1

A silicone gel composition (Composition 1) was prepared by mixing 60 parts of both end dimethylvinylsiloxy-blocked dimethylsiloxane/diphenylsiloxane copolymer represented by the average molecular formula (4) and having a viscosity of 1,000 mPa·s at 25° C., 40 parts of trimethylsiloxy and dimethylvinylsiloxy-blocked dimethylsiloxane/diphenylsiloxane copolymer represented by the average molecular formula (5) and having a viscosity of 700 mPa·s at 25° C., 0.55 part of both end trimethylsiloxy-blocked dimethylsiloxane/methylhydrogensiloxane copolymer represented by the average molecular formula (6) and having a viscosity of 100 mPa·s at 25° C., 5.6 parts of both end dimethylhydrogensiloxy-blocked dimethylpolysiloxane represented by the average molecular formula (7) and having a viscosity of 18 mPa·s at 25° C. (to give 1.15 silicon-bonded hydrogen in component (B) per silicon-bonded alkenyl in the composition, that is, H/Vi ratio=1.15), 0.05 part of a dimethylpolysiloxane solution of chloroplatinic acid-vinylsiloxane complex (platinum concentration 1%), 0.02 part of ethynylcyclohexanol, and 0.05 part of nickel 2-ethylhexanoate (about 500 ppm based on the total weight of the composition) until uniform.

[Chemical Formula 2]

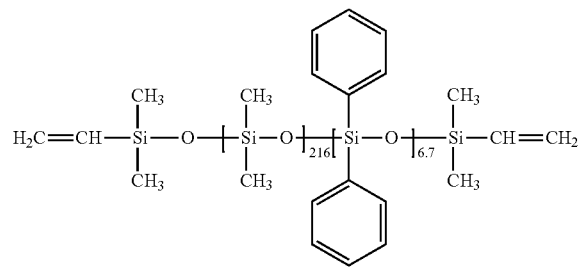

(4)

[Chemical Formula 3]

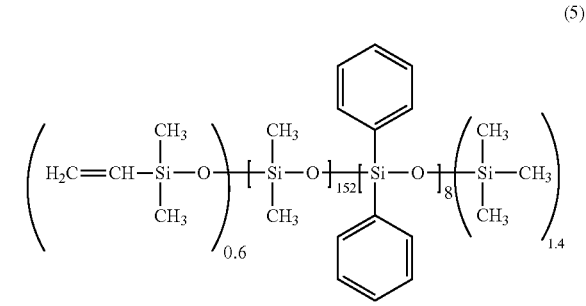

(5)

-continued

[Chemical Formula 4]

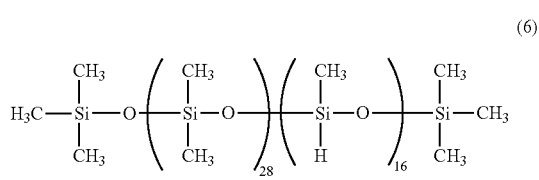

(6)

[Chemical Formula 5]

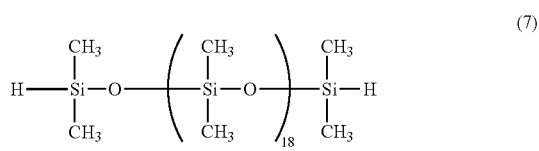

(7)

The resulting Composition 1 was heat cured at 80° C. for 60 minutes, yielding a cured silicone gel having a penetration of 45.

Example 2

Composition 2 was prepared as in Example 1 except that 0.01 part of niobium 2-ethylhexanoate (about 100 ppm based on the total weight of the composition) was used instead of 0.05 part of nickel 2-ethylhexanoate. Composition 2 was heat cured at 80° C. for 60 minutes, yielding a cured silicone gel having a penetration of 50.

Comparative Example 1

Composition 3 (nickel carboxylate and/or niobium carboxylate content 0 ppm) was prepared as in Example 1 except that 0.05 part of nickel 2-ethylhexanoate was omitted. Composition 3 was heat cured at 80° C. for 60 minutes, yielding a cured silicone gel having a penetration of 40.

Comparative Example 2

Composition 4 (iron content 120 ppm based on the total weight of the composition) was prepared as in Example 1 except that 0.15 part of a solution of a 2-ethylhexanoic acid salt composed mainly of iron (elemental iron content 8%) was used instead of 0.05 part of nickel 2-ethylhexanoate. Composition 4 was heat cured at 80° C. for 60 minutes, yielding a cured silicone gel having a penetration of 40.

Comparative Example 3

Composition 5 was prepared as in Example 1 except that 0.15 part of nickel 2-ethylhexanoate (about 1,500 ppm based on the total weight of the composition) was used. Composition 5 was heat cured at 80° C. for 60 minutes, yielding a cured silicone gel having a penetration of 80.

Comparative Example 4

Composition 6 was prepared as in Example 2 except that 0.15 part of niobium 2-ethylhexanoate (about 1,500 ppm based on the total weight of the composition) was used. Composition 6 was heat cured at 80° C. for 60 minutes, yielding a cured silicone gel having a penetration of 90.

[Test]

The cured silicone gels in Examples 1 and 2 and Comparative Examples 1 to 4 were examined by the following tests. The results are shown in Table 1.

Evaluation of Volume Resistivity:

The volume resistivity of the cured silicone gels in Examples and Comparative Examples was measured according to JIS K6249.

Evaluation of Loss Factor:

The silicone gel compositions in Examples and Comparative Examples were tested by the slit-shearing method using Rheogel E4000 (UBM Co., Ltd.). The cured silicone gels obtained by heat curing at 80° C. for 60 minutes were cooled to 25° C. and measured for a loss factor at 1 Hz and 10 Hz.

Evaluation of Heat Resistance:

Each of the cured silicone gels in Examples and Comparative Examples was measured for penetration after heat resistance tests of heating at 215° C. for 1,000 hours and at 250° C. for 200 hours. A sample with a penetration of more than 150 was rated "failure". Also the silicone gels after the 215° C./1,000 hr test and 250° C./200 hr test were visually observed for cracks.

TABLE 1

|  |  |  | Example | | Comparative Example | | | |
|---|---|---|---|---|---|---|---|---|
|  |  |  | 1 | 2 | 1 | 2 | 3 | 4 |
| Content of heat resistance-imparting component in composition (ppm) | | | 500 | 100 | 0 | 120 | 1,500 | 1,500 |
| H/Vi | | | 1.15 | 1.15 | 1.15 | 1.15 | 1.15 | 1.15 |
| Penetration @¼ cone | | | 45 | 50 | 40 | 40 | 80 | 90 |
| Volume resistivity (TΩ · m) | | | 3.0 | 1.0 | 5.5 | 0.001 | 0.05 | 0.02 |
| Loss factor (tanδ) | | 1 Hz | 0.19 | 0.20 | 0.18 | 0.19 | 0.21 | 0.21 |
|  | | 10 Hz | 0.46 | 0.46 | 0.43 | 0.43 | 0.47 | 0.47 |
| Heat resistance | 215° C./1,000 hr | penetration | 80 | 70 | 5 | 45 | >150 (failure) | >150 (failure) |
|  |  | cracks | nil | nil | found | nil | nil | nil |
|  | 250° C./200 hr | penetration | 70 | 65 | 1 | 5 | 90 | 100 |
|  |  | cracks | nil | nil | found | found | nil | nil |

[Evaluation]

The compositions of Examples 1 and 2 within the scope of the invention afforded cured silicone gels having good rubber properties. The cured silicone gels showed neither drops of penetration nor appearance anomalies such as cracks under long-term heating conditions at 215° C. or 250° C., demonstrating stability.

By contrast, the compositions of Comparative Examples 1 and 2 which did not contain the key component (D), that is, did not meet the requirement of the invention to contain a nickel carboxylate and/or niobium carboxylate as an essential component in the inventive composition showed a lowering of heat resistance or a substantial drop of insulation. The compositions of Comparative Examples 3 and 4 which contained an excess of the key component (D), i.e., an amount of the nickel carboxylate and/or niobium carboxylate outside the range of the invention showed a significant loss of softness in the heat resistance test and a drop of insulation.

INDUSTRIAL APPLICABILITY

Since the silicone gel composition of the invention cures into a cured silicone gel which maintains its characteristic properties such as low elastic modulus and low stress even after holding in an atmosphere at 200° C. for a long period of time, it is expected that the composition is improved in long-term durability in the protection of electronic parts such as ICs and hybrid ICs.

The invention claimed is:

1. A silicone gel composition comprising:
(A) 100 parts by weight of an organopolysiloxane having at least one silicon-bonded alkenyl group per molecule, represented by the average compositional formula (1):

$$R_a R^1_b SiO_{(4-a-b)/2} \quad (1)$$

wherein R is independently alkenyl, $R^1$ is independently a substituted or unsubstituted monovalent hydrocarbon group free of aliphatic unsaturation, a is a positive number of 0.0001 to 0.2, b is a positive number of 1.7 to 2.2, and the sum a+b is 1.9 to 2.4, (B) an organohydrogenpolysiloxane having at least two silicon-bonded hydrogen atoms per molecule, represented by the average compositional formula (2):

$$R^2_c H_d SiO_{(4-c-d)/2} \quad (2)$$

wherein $R^2$ is independently a substituted or unsubstituted monovalent hydrocarbon group free of aliphatic unsaturation, c is a positive number of 0.7 to 2.2, d is a positive number of 0.001 to 0.5, and the sum c+d is 0.8 to 3, in such an amount as to give 0.01 to 3 silicon-bonded hydrogen atoms in component (B) per silicon-bonded alkenyl in the entire composition, (C) an effective amount of a platinum-based catalyst, and
(D) a nickel carboxylate and/or niobium carboxylate having the formula (3):

$$(R^3 COO)_f M \quad (3)$$

wherein $R^3$ which may be the same or different is a monovalent hydrocarbon group, M is at least one metal selected from nickel and niobium, f is 2 when M is nickel, and f is 4 or 5 when M is niobium, and the nickel carboxylate and/or niobium carboxylate as component (D) is present in an amount of 100 ppm to 500 ppm based on the total weight of the composition.

2. A silicone gel composition comprising:
(A) 100 parts by weight of an organopolysiloxane having at least one silicon-bonded alkenyl group per molecule, represented by the average compositional formula (1):

$$R_a R^1_b SiO_{(4-a-b)/2} \quad (1)$$

wherein R is independently alkenyl, $R^1$ is independently a substituted or unsubstituted monovalent hydrocarbon group free of aliphatic unsaturation, a is a positive number of 0.0001 to 0.2, b is a positive number of 1.7 to 2.2, and the sum a+b is 1.9 to 2.4, (B) an organohydrogenpolysiloxane having at least two silicon-bonded hydrogen atoms per molecule, represented by the average compositional formula (2):

$$R^2_c H_d SiO_{(4-c-d)/2} \quad (2)$$

wherein $R^2$ is independently a substituted or unsubstituted monovalent hydrocarbon group free of aliphatic unsaturation, c is a positive number of 0.7 to 2.2, d is a positive number of 0.001 to 0.5, and the sum c+d is 0.8 to 3, in such an amount as to give 0.01 to 3 silicon-bonded hydrogen atoms in component (B) per silicon-bonded alkenyl in the entire composition, (C) an effective amount of a platinum-based catalyst, and
(D) a niobium carboxylate having the formula (3):

$$(R^3 COO)_f M \quad (3)$$

wherein $R^3$ which may be the same or different is a monovalent hydrocarbon group, M is niobium, f is 4 or 5, in an amount of 1 to 1,000 ppm based on the total weight of the composition.

3. The silicone gel composition of claim 1 or 2 which cures into a cured silicone gel having a penetration of 10 to 150 according to JIS K2220.

4. The silicone gel composition of claim 1 or 2 which cures into a cured silicone gel having a loss factor of 0.1 to 1.0 at 25° C. and shear frequency 1 Hz and a loss factor of 0.3 to 1.5 at 25° C. and shear frequency 10 Hz.

5. A cured silicone gel which is obtained by curing the silicone gel composition of claim 1 or 2.

6. A cured silicone gel which is obtained by curing the silicone gel composition of claim 3.

7. A cured silicone gel which is obtained by curing the silicone gel composition of claim 4.

* * * * *